J. Lippincott.
Manufacture of Axes.
N° 66978.    Patented Jul. 23. 1867.
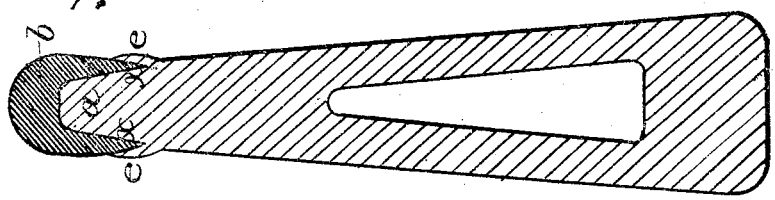
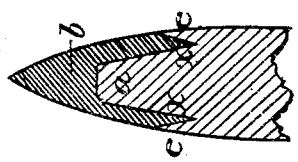
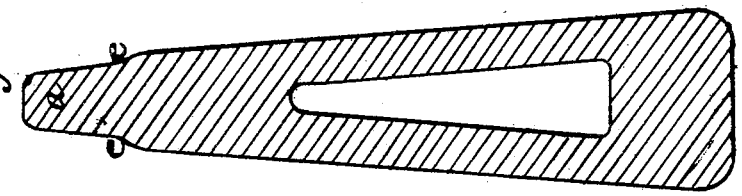
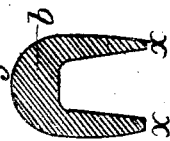
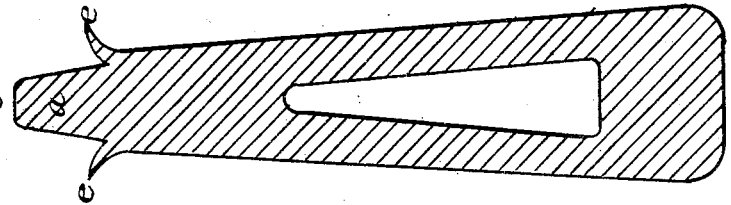
Witnesses;
W. T. Graham
H. B. Paxton
Inventor;
John Lippincott,
by Bakewell & Christy
his Attorneys

United States Patent Office.

JOHN LIPPINCOTT, OF PITTSBURG, PENNSYLVANIA.

*Letters Patent No. 66,978, dated July 23, 1867.*

---

IMPROVEMENT IN THE MANUFACTURE OF AXES.

---

The Schedule referred to in these Letters Patent and making part of the same.

---

TO ALL WHOM IT MAY CONCERN:

Be it known that I, JOHN LIPPINCOTT, of Pittsburg, in the county of Allegheny, and State of Pennsylvania, have invented a new and useful Mode of Welding Steels to the Heads or Polls of Axes and other edge tools; and I do hereby declare the following to be a full, clear, and exact description thereof, reference being had to the accompanying drawings, making a part of this specification, in which—

Figure 1 is a cross-section of an axe-head or poll ready for scarfing.

Figure 2 is a cross-section of a similar axe-head or poll cut or scarfed.

Figure 3 is a cross-section of the U-shaped steel which I employ.

Figure 4 is a cross-section of an axe-head or poll with the U-shaped steel attached, and the lips of the scarfing closed down; and Figure 5 is a cross-section of the blade or bit of an axe drawn out, showing the shape of the welding which is made in the manufacture of axes or other edged tools, by my improved mode as hereinafter to be described.

Like letters of reference indicate like parts.

My improvement relates more particularly to that description of U-shaped steel for edge tools now known among edge-tool makers as Mann's patent steel, bent into the shape of the letter U, and for which Harvey Mann secured Letters Patent dated June 3, 1862.

I do not wish to be understood as laying any claim to forming steels for edge tools into the U-shape, as described in the Letters Patent above referred to; but the nature of my improvement consists in preparing the poll or head of the tool in such a manner as to admit of welding the thin edges of the U-shaped steels referred to into the iron of the axe-head, instead of on to the iron, as now practised by parties using Mann's patent steels. In the latter case, the polls of axes require no special preparation, but the edges of the steels must be rolled or hammered almost to a sharp edge to insure their working satisfactorily, and should there be any variation in the thickness of the edges, there is invariably a cold-shut or imperfect weld formed at the junction of the iron and steel at the thick place or places in the edges of the steel. And as the steel is much harder than the iron, it meshes into the latter, and produces thereby imperfect tools. As another difficulty, I find that unless the greatest care is exercised by the heater in taking a welding heat, the thin edges of the steel are liable to burn before the rest of the steel is sufficiently hot to weld, and thereby making the tools still more imperfect. But a yet more serious difficulty in connection with the present mode of welding lies in the frequency of mis-welds or poor welds caused by small particles of dirt from the fire, or scale, getting between the iron and the steel, in consequence of the exposed condition of the scarfed edges of the steel. This is frequently the case, and the difficulty is still further enhanced by the fact that the workman cannot tell until after he has partially drawn his bit, whether it is sound or not. And as all imperfect welds or cold shuts greatly depreciate the value of the tools in which they occur, I consider the advantages of Mann's improved steel as it is now worked more than counterbalanced by the number of imperfect tools thus unavoidably produced. By my improved mode of welding the steel I overcome all the difficulties and objections above enumerated.

To enable others skilled in the art to make and use my invention, I will proceed more particularly to describe my mode of operation.

The poll or head of the axe is prepared in the usual way, and of the usual shape, with this addition, that on the sides of the head, at about the points where the extreme edges of the U-shaped steel $b$ will be attached, I make shoulders $c$ $c$, by drawing out that part of the poll which the U-shaped steel $b$ is designed to cover, (marked $a$ in the drawings,) or by other means by which such work is usually done. Commonly, however, I do it by the process of drawing when the poll is hot, and at the same heat with which the poll is welded up or formed. Then by the use of curved knives set opposite to each other, and adjustable for polls of different thicknesses, or by other equivalent known means, I cut or scarf the shoulders $c$ $c$ so as to form the lips $e$ $e$. The U-shaped steel $b$ made as set forth in the patent to Harvey Mann, already referred to, is then driven on to the poll, with its edges $x$ $x$ under the lips $e$ $e$, which lips are then closed down on to the edges $x$ $x$, as represented in fig. 4. The axe is then ready for welding. In this way the steel requires no further preparation than bending, and the work of thinning its edges $x$ $x$ is rendered unnecessary. Such edges are also protected by the lips $e$ $e$, so as to preclude the possibility of their burning at the scarf line in process of taking the welding heat. But it is not absolutely necessary that shoulders c c be formed on the sides of the poll, as it is practicable to split the sides of the poll in the manner above described without them, but I prefer making the shoulder to secure uniformity and expedition in the work. Practically it is much easier to weld iron on to steel than steel on to iron, and owing to this fact, by welding the iron and steel in the manner above described, I am enabled to make comparatively sound work, thereby enhancing greatly the value of the product. I also avoid the other difficulties which arise as above stated, in connection with welding the U-shaped steel $b$ in the manner described in Mann's patent. I sometimes vary the mode of operation thus described by making the edges $x\ x$ of the U-shaped steel $b$ thin and sharp, and then the axe-poll being heated, I place the steel $b$ in position so that the edges $x\ x$ so sharpened shall rest snugly on the shoulders $c\ c$. The steel $b$ is then driven down on to and into the axe-poll. The steel being cold and the iron hot, the sharpened edges $x\ x$ will take the place of the cutters above mentioned, and cut into and bury themselves in the iron of the axe-poll. The axe may then be heated preparatory to welding.

I do not wish to confine myself to any of the modes described for preparing the axe for welding, since I adopt any known mode generally in use in connection with such work, whereby the edges $x\ x$ of the steel $b$ shall be embedded in the axe-poll on its opposite faces, and under and beyond the scarf line, so that the iron may be welded on to the steel. In this way I am able to take better welds, and make sounder work than when the steels or edges of the steels are welded on to the iron as is practised by Harvey Mann and parties using his patent steels. After the steel $b$ is attached to the axe-poll, as above described, I heat both to a welding heat, and draw out the steel $b$ to an edge, substantially as represented in fig. 5. The other parts of the work connected with finishing the axe are carried on at the same time or afterwards, substantially in the manner now generally practised.

I do not limit myself in my invention to the manufacture of axes alone, but extend and apply it to the making of edge tools of all kinds, which have or may have iron backs or heads of sufficient thickness and depth to render it practicable to cut or scarf their opposite faces, for the purpose of embedding therein the edges of U-shaped steels, from which to form a bit, blade, or edge. The heads or backs may in such cases be made with shoulders $c\ c$ or not, at the pleasure of the manufacturer or workman, though commonly I make the shoulders $c\ c$ substantially as described, since practically the work will thereby be better and more uniform in its character.

What I claim as my invention, and desire to secure by Letters Patent, is—

The method hereinbefore described of securing the steel bit to axe-polls, and other edge tools, by inserting the bifurcated edges $x\ x$ of the bit into a slot or scarf on each side of the stock or poll, so as to lap the edge of the stock or poll over the bit, and then welding them together, substantially as and for the purposes hereinbefore set forth.

In testimony whereof I, the said JOHN LIPPINCOTT, have hereunto set my hand in presence of—

JOHN LIPPINCOTT.

Witnesses:
    GEO. H. CHRISTY,
    A. S. NICHOLSON.